United States Patent
Li et al.

(10) Patent No.: US 11,277,382 B2
(45) Date of Patent: Mar. 15, 2022

(54) FILTER-BASED PACKET HANDLING AT VIRTUAL NETWORK ADAPTERS

(71) Applicant: VMware, Inc., Palo Alto, CA (US)

(72) Inventors: Peng Li, Fremont, CA (US); Guolin Yang, San Jose, CA (US); Yong Wang, San Jose, CA (US); Wenyi Jiang, Palo Alto, CA (US); Boon Seong Ang, Saratoga, CA (US)

(73) Assignee: VMWARE, INC., Palo Alto, CA (US)

( * ) Notice: Subject to any disclaimer, the term of this patent is extended or adjusted under 35 U.S.C. 154(b) by 290 days.

(21) Appl. No.: 16/517,670

(22) Filed: Jul. 22, 2019

(65) Prior Publication Data

US 2021/0029083 A1 Jan. 28, 2021

(51) Int. Cl.
*H04L 29/06* (2006.01)
*G06F 9/455* (2018.01)

(52) U.S. Cl.
CPC ...... *H04L 63/0245* (2013.01); *G06F 9/45558* (2013.01); *H04L 63/0272* (2013.01); *H04L 63/145* (2013.01); *H04L 63/1416* (2013.01); *H04L 63/1466* (2013.01)

(58) Field of Classification Search
None
See application file for complete search history.

(56) References Cited

U.S. PATENT DOCUMENTS

| 2015/0055456 A1* | 2/2015 | Agarwal | H04L 47/6295 370/230 |
| 2015/0055468 A1* | 2/2015 | Agarwal | H04L 47/2475 370/232 |
| 2015/0085868 A1* | 3/2015 | Snyder, II | G06F 9/45533 370/401 |
| 2015/0142832 A1* | 5/2015 | Pope | H04L 69/16 707/754 |
| 2015/0261556 A1* | 9/2015 | Jain | H04L 49/70 718/1 |

(Continued)

OTHER PUBLICATIONS

Antoine Kaufmann, Simon Peter, Naveen Kr. Sharma, Thomas Anderson, and Arvind Krishnamurthy. 2016. High Performance Packet Processing with FlexNIC. SIGARCH Comput. Archit. News 44, 2 (May 2016), 67-81. DOI:https://doi.org/10.1145/2980024. 2872367 (Year: 2016).*

(Continued)

*Primary Examiner* — Jeffery L Williams
(74) *Attorney, Agent, or Firm* — Su IP Consulting

(57) ABSTRACT

Example methods and computer systems are provided for filter-based packet handling at a virtual network adapter. The method may comprise: receiving an ingress packet destined for the virtualized computing instance that is supported by the host and connected to the virtual network adapter; and matching the ingress packet to one of multiple filters configured for the virtual network adapter. The multiple filters may include a first filter specifying one or more first packet characteristics and a second filter specifying one or more second packet characteristics. The method may also comprise: in response to matching the ingress packet to the first filter, assigning the ingress packet to a first packet queue; and in response to matching the ingress packet to the second filter, assigning the ingress packet to a second packet queue.

21 Claims, 7 Drawing Sheets

(56) References Cited

U.S. PATENT DOCUMENTS

| | | | |
|---|---|---|---|
| 2015/0295830 A1* | 10/2015 | Talla | G06F 1/00 |
| | | | 370/235 |
| 2015/0370586 A1* | 12/2015 | Cooper | G06F 12/0223 |
| | | | 710/308 |
| 2017/0005931 A1* | 1/2017 | Mehta | H04L 45/7453 |
| 2017/0126567 A1* | 5/2017 | Wang | H04L 12/4633 |
| 2018/0069924 A1* | 3/2018 | Tumuluru | G06F 9/5077 |
| 2018/0352474 A1* | 12/2018 | Mehta | H04L 49/9057 |
| 2019/0173851 A1* | 6/2019 | Jain | H04L 45/50 |
| 2020/0084192 A1* | 3/2020 | Wang | H04L 63/0485 |
| 2020/0104269 A1* | 4/2020 | Pope | G06F 13/4027 |
| 2020/0274820 A1* | 8/2020 | Holla | H04L 41/0806 |
| 2020/0304418 A1* | 9/2020 | Holla | H04L 49/9068 |
| 2021/0029083 A1* | 1/2021 | Li | H04L 63/0236 |

OTHER PUBLICATIONS

Vmware, "Leveraging NIC Technology to Improve Network Performance in VMware vSphere", Technical White Paper, 2015, p. 1-12, https://www.vmware.com/techpapers/2015/leveraging-nic-technology-to-improve-network-perfo-10450.html (Year: 2015).*

H. Oi and F. Nakajima, "Performance Analysis of Large Receive Offload in a Xen Virtualized System," 2009 International Conference on Computer Engineering and Technology, 2009, pp. 475-480, doi: 10.1109/ICCET.2009.112. (Year: 2009).*

Zhou, FF., Ma, RH., Li, J. et al. Optimizations for High Performance Network Virtualization. J. Comput. Sci. Technol. 31, 107-116 (2016). https://doi.org/10.1007/s11390-016-1614-x (Year: 2016).*

Hatori, Takayuki & Oi, Hitoshi. (2008). Implementation and Analysis of Large Receive Offload in a Virtualized System, p. 1-5. (Year: 2008).*

* cited by examiner

| FILTER (Fj) | CHARACTERISTICS (Cj) | ACTION (Aj) | |
|---|---|---|---|
| F0 | (UDP, dstPort = 3784) | ASSIGN to Q0 | 420 |
| F1 | (TCP, dstPort = 150) | ASSIGN to Q1 | 421 |
| F2 | (HTTPS, dstPort = 443) | ASSIGN to Q2 | 422 |
| F3 | (TCP, srcIP = 10.10.10.1) | DROP | 423 |
| F4 | ANY | ASSIGN to Q3 | 424 |

FILTER-BASED PACKET HANDLING AT VIRTUAL NETWORK ADAPTERS

BACKGROUND

Virtualization allows the abstraction and pooling of hardware resources to support virtual machines in a Software-Defined Networking (SDN) environment, such as a Software-Defined Data Center (SDDC). For example, through server virtualization, virtualization computing instances such as virtual machines (VMs) running different operating systems may be supported by the same physical machine (e.g., referred to as a "host"). Each virtual machine is generally provisioned with virtual resources to run an operating system and applications. The virtual resources may include central processing unit (CPU) resources, memory resources, storage resources, network resources, etc. In practice, a VM may experience performance issues when there is a large volume of traffic going through its virtual network adapter, where packets may be dropped.

DETAILED DESCRIPTION

Figure 1:
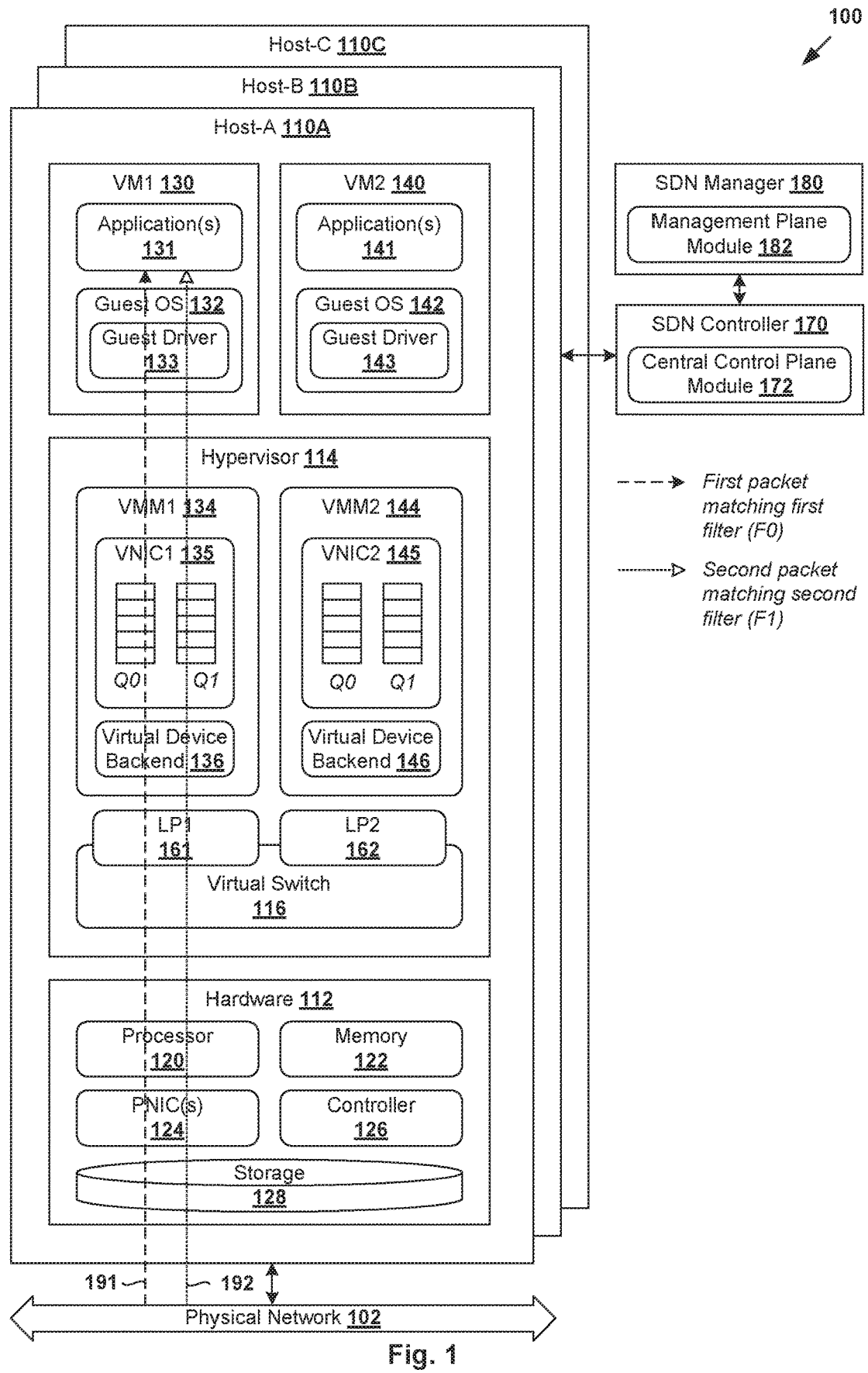
FIG. 1 is a schematic diagram illustrating an example Software-Defined Networking (SDN) environment in which filter-based packet handling at a virtual network adapter may be performed.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

Challenges relating to packet handling will now be explained in more detail using FIG. 1, which is a schematic diagram illustrating example Software-Defined Networking (SDN) environment 100 in which filter-based packet handling at a virtual network adapter may be performed. It should be understood that, depending on the desired implementation, SDN environment 100 may include additional and/or alternative components than that shown in FIG. 1.

In the example in FIG. 1, SDN environment 100 includes multiple hosts 110A-C that are connected to physical network 102. For simplicity, only host-A 110A is shown in detailed. Each host 110A/110B/110C includes suitable virtualization software (e.g., hypervisor 114) and hardware 112 to support virtual machines (VMs), such as VM1 130 and VM2 140 on host-A 110A. In practice, there may be multiple hosts in SDN environment 100, each supporting tens or hundreds of virtual machines in practice. In practice, "hosts" are also known as "computer systems", "host computers", "host devices", "physical servers", "transport nodes", etc.

Hypervisor 114 maintains a mapping between underlying hardware 112 of host 110A and virtual resources allocated to respective VMs 130-140. Hardware 112 includes suitable physical components, such as central processing unit(s) or processor(s) 120, memory 122, physical network interface controllers (PNICs) 124, storage controller 126, and storage disk(s) 128, etc. Virtual resources are allocated to VM 130/140 to support applications 131/141 and guest operating system (OS) 132/142. For example, corresponding to hardware 112, the virtual resources or virtual devices may include virtual CPU, guest physical memory (i.e., memory visible to the guest OS running in a VM), virtual disk(s), virtual network interface controller (VNIC), etc.

Virtual machine monitor (VMM) 134/144 is implemented by hypervisor 114 to emulate various hardware resources for VM 130/140. For example, VMM1 134 is configured to emulate VNIC1 135 to provide network access for VM1 130, and VMM2 144 to emulate VNIC2 145 for VM2 140. In practice, VMM 134/144 may be considered as part of VM 130/140, or alternatively, separated from VM 130/140. In both cases, VMM 134/144 maintains the state of VNIC 135/145 to facilitate migration of VM 130/140. In practice, one VM may have multiple VNICs (each VNIC having its own network address). Any suitable virtual network adapter technology may be used for VNIC 135/136, such as VMXNET3 (available from VMware, Inc.), E1000 network interface (an emulated version of a Gigabit Ethernet), or the like, etc.

Although examples of the present disclosure refer to virtual machines, it should be understood that a "virtual machine" running on a host is merely one example of a "virtualized computing instance" or "workload." A virtualized computing instance may represent an addressable data compute node or isolated user space instance. In practice, any suitable technology may be used to provide isolated user space instances, not just hardware virtualization. Other virtualized computing instances may include containers (e.g., running within a VM or on top of a host operating system without the need for a hypervisor or separate operating system or implemented as an operating system level virtualization), virtual private servers, client computers, etc. Such container technology is available from, among others, Docker, Inc. The VMs may also be complete computational environments, containing virtual equivalents of the hardware and software components of a physical computing system. The term "hypervisor" may refer generally to a software layer or component that supports the execution of multiple virtualized computing instances, including system-level software in guest VMs that supports namespace containers such as Docker, etc. Hypervisor 114 may implement any suitable virtualization technology, such as VMware ESX® or ESXi™ (available from VMware, Inc.), kernel-based virtual machine (KVM), etc.

Hypervisor 114 further implements virtual switch 116 to handle traffic forwarding to and from VMs 130-140. For example, VM 130/140 may send egress (i.e., outgoing) packets and receive ingress packets (i.e., incoming) via VNIC 135/145 and logical port 161/162. As used herein, the term "logical port" may refer generally to a port on a logical switch to which a virtualized computing instance is connected. A "logical switch" may refer generally to an SDN construct that is collectively implemented by multiple virtual switches, whereas a "virtual switch" may refer generally to a software switch or software implementation of a physical switch. In practice, there is usually a one-to-one mapping between a logical port on a logical switch and a virtual port on virtual switch 116. However, the mapping may change in some scenarios, such as when the logical port is mapped to a different virtual port on a different virtual switch after migration of the corresponding virtualized computing instance (e.g., when the source and destination hosts do not have a distributed virtual switch spanning them).

SDN controller 170 and SDN manager 180 are example management entities that facilitate management and configuration of SDN environment 100. One example of an SDN controller is the NSX controller component of VMware NSX® (available from VMware, Inc.) that may be a member of a controller cluster (not shown) and configurable using an SDN manager (not shown for simplicity). One example of an SDN manager is the NSX manager component that provides an interface for end users to perform any suitable configuration in SDN environment 100. In practice, management entity 170/180 may be implemented using physical machine(s), virtual machine(s), a combination thereof, etc. SDN controller 170 may send configuration information to each host 110A/110B/110C via a control-plane channel established between them, such as using TCP over Secure Sockets Layer (SSL), etc.

As used herein, the term "packet" may refer generally to a group of bits that can be transported together from a source to a destination, such as a "segment," "frame," "message," "datagram," etc. The term "traffic" may refer generally to multiple packets. The term "layer-2" may refer generally to a link layer or Media Access Control (MAC) layer; "layer-3" to a network or Internet Protocol (IP) layer; and "layer-4" to a transport layer (e.g., using Transmission Control Protocol (TCP), User Datagram Protocol (UDP), etc.), in the Open System Interconnection (OSI) model, although the concepts described herein may be used with other networking models. Physical network 102 may be any suitable network, such as wide area network, virtual private network (VPN), etc.

In practice, VM 130/140 may experience performance issues when there is a large volume of traffic going through VNIC 135/145. For example, packets may be dropped at VNIC 135/145 due to insufficiency of memory space to store packets and/or CPU cycles to process the packets. Such performance issues affect packet processing at VMs. In one example scenario, some VMs may rely on a reliable exchange of control packets among peers. In this case, the loss of control packets may lead to service disruption, which is undesirable.

Filter-Based Packet Handling

According to examples of the present disclosure, packet handling may be implemented at virtual network adapters in an improved manner. In particular, a "filter-based" approach may be implemented to provide a finer granularity of control for steering packets to dedicated queues at VNIC 135/145, or dropping the packets to protect against malicious attacks. Throughout the present disclosure, the term "virtual network adapter" or "virtual network interface controller" (e.g., VNIC 135/145) may refer to a virtual device that connects a virtualized computing instance (e.g., VM) to physical network 102 via a physical network adapter (e.g., PNIC 124).

Figure 2:
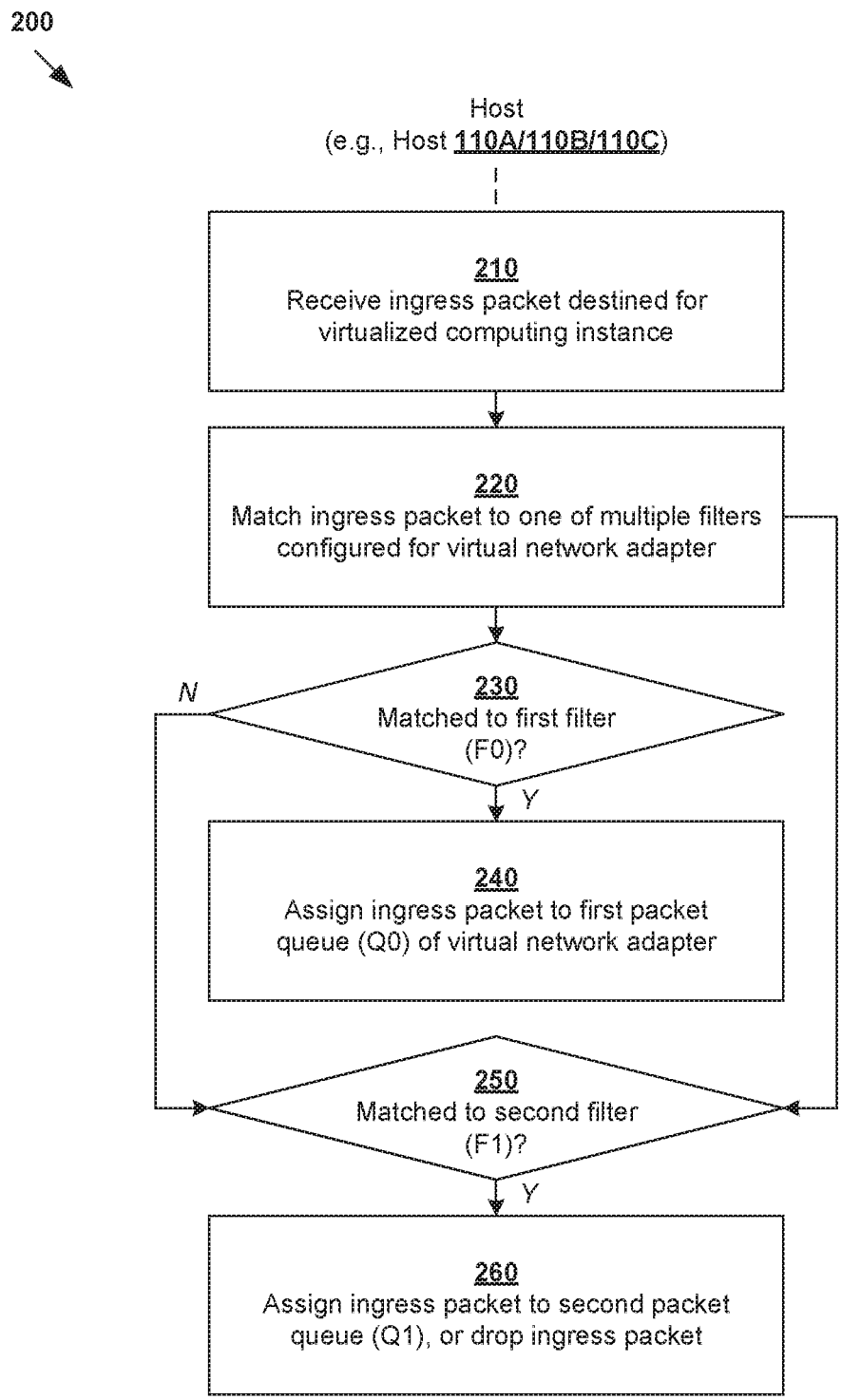
FIG. 2 is a flowchart of an example process for a host to perform filter-based packet handling at a virtual network adapter in an SDN environment.

In more detail, FIG. 2 is a flowchart of example process 200 for a host to perform filter-based packet handling at a virtual network adapter in an SDN environment. Example process 200 may include one or more operations, functions, or actions illustrated by one or more blocks, such as 210 to 260. The various blocks may be combined into fewer blocks, divided into additional blocks, and/or eliminated depending on the desired implementation. Throughout the present disclosure, various examples will be discussed using host-A 110A as an example "host," VM 130/140 as an example "virtualized computing instance," VNIC 135/145 as an example "virtual network adapter," etc.

At 210 in FIG. 2, host-A 110A may receive an ingress packet destined for VM1 130 that is supported by host-A 110A and connected to VNIC1 135. At 220, host-A 110A may match the ingress packet to one of multiple filters configured for VNIC1 135. For example, a first filter may specify first packet characteristic(s), and a second filter may specify second packet characteristic(s). As used herein, the term "filter" may refer generally to a rule or policy specifying a set of packet characteristics to be matched with a packet, and an action to be performed when there is a match. Any suitable "packet characteristic" may be used, such as using inner and/or outer packet header information, packet payload information, packet metadata, any combination thereof, etc.

At 230 and 240 in FIG. 2, in response to matching the ingress packet to the first filter, the ingress packet may be assigned to a first packet queue of VNIC1 135 for subsequent processing by VM1 130. In the example in FIG. 1, a first filter (labelled "F0") may be configured to specify first packet characteristic(s) to be matched with an ingress packet, and an action to assign the ingress packet to a first packet queue (labelled "Q0") of VNIC1 135 when there is a match. See 191 in FIG. 1.

At 250 and 260 in FIG. 2, in response to matching the ingress packet to the second filter, the ingress packet may be assigned to a second packet queue of VNIC1 135 for subsequent processing by VM1 130. Alternatively, the ingress packet may be dropped according to the second filter. In the example in FIG. 1, a second filter (labelled "F1") may be configured to specify second packet characteristic(s) to be matched with an ingress packet, and an action to assign the ingress packet to a second packet queue (labelled "Q1") of VNIC1 135 when there is a match. See 192 in FIG. 1.

As will be discussed further using FIG. 3 and FIG. 4, filter configuration may be initiated by VM 130/140, thereby allowing application(s) 131 owning VNIC1 135 to define which packets to prioritize or segregate. For example, prior to receiving the ingress packet at block 210, the first filter and the second filter may be configured based on a request from VM1 130 or more particularly application 131 supported by VM1 130. The request may be sent or passed to virtual device backend module 136 using guest driver 133 supported by guest OS 132 associated with VM1 130. Upon receiving the request, the filter configuration may be performed by virtual device backend module 136 associated with VNIC1 135. Alternatively or additionally, filter configuration may be initiated based on control information from management entity 170/180.

Depending on the desired implementation, any suitable filters may be configured and matched to ingress packets to support various use cases, such as differentiated (or prioritized) packet handling for control packets and data packets (see FIG. 5), intrusion detection and prevention for blocking malicious packets (see FIG. 6), application-aware flow load balancing (see FIG. 6), etc. Examples of the present disclosure should be contrasted against conventional approaches that require changes to buffer size or CPU configuration. For example, one conventional approach for mitigating packet loss is to increase the buffer size for receiving traffic, in the hope that CPU cycles will become available in time to process the buffered packets. Another conventional approach is Receive Side Scaling (RSS), which is a mechanism that relies on multiple virtual CPUs to provide extra CPU power to improve multi-core efficiency and processor cache utilization.

Example Filter Configuration

Figure 3:
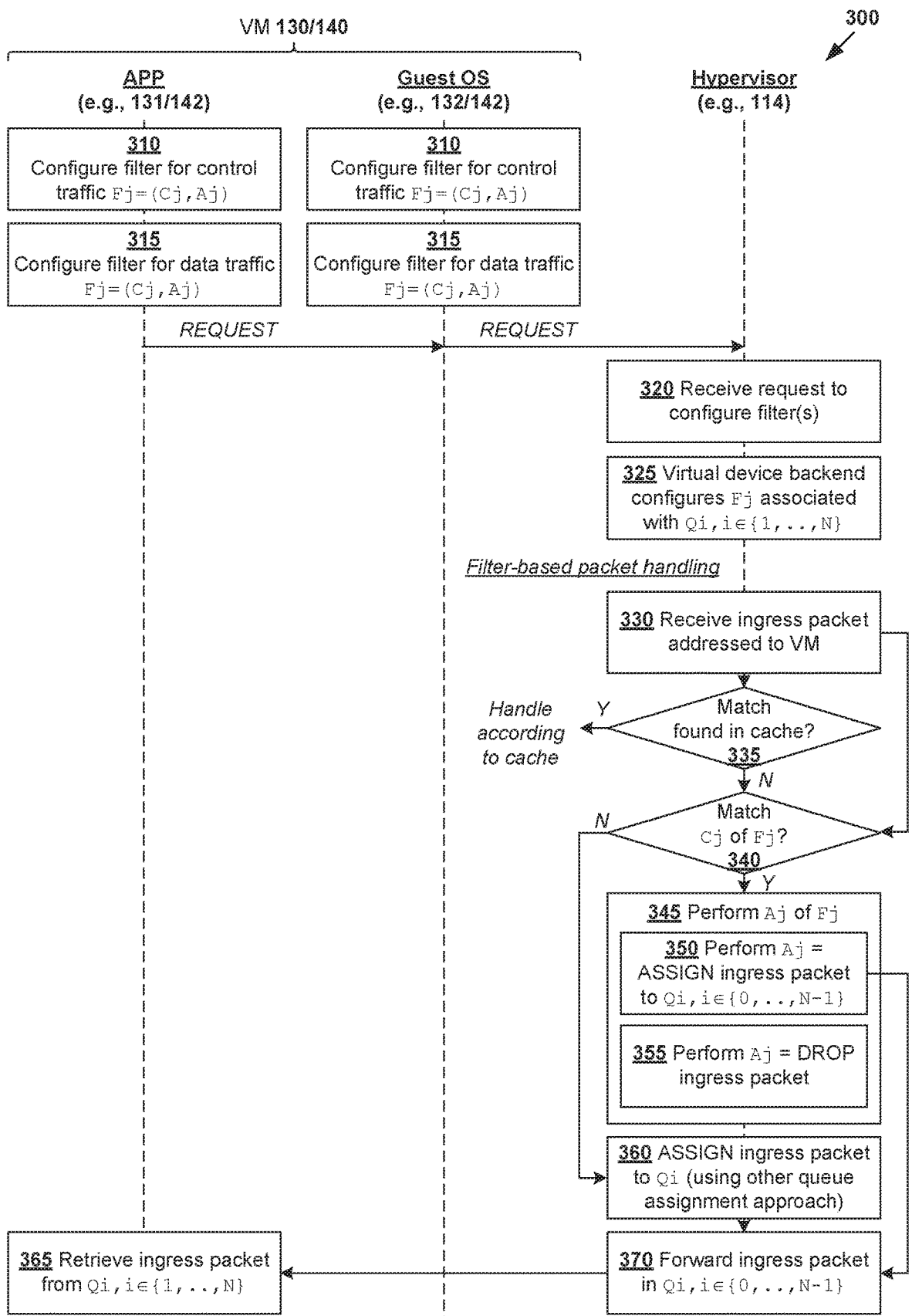
FIG. 3 is a flowchart of an example detailed process for filter-based packet handling at a virtual network adapter in an SDN environment.

FIG. 3 is a flowchart of example detailed process 300 of filter-based packet handling at a virtual network adapter in SDN environment 100. Example process 300 may include one or more operations, functions, or actions illustrated by one or more blocks, such as 310 to 370. The various blocks may be combined into fewer blocks, divided into additional blocks, and/or eliminated depending on the desired implementation. Some examples will be explained using FIG. 4, which is a schematic diagram illustrating example filter configuration 400 for a virtual network adapter according to the example in FIG. 3.

At 310-315 in FIG. 3, a set of M filters may be configured to differentiate various types of traffic. The configuration may be initiated by VM1 130, such as application(s) 131 issuing a request (see 430 in FIG. 4) to virtual device backend module 136 via guest device driver 133. In practice, guest device driver 133 may be installed to enable communication between guest OS 132 and VNIC1 135. In this case, virtual device backend module 136 supported by hypervisor 114 may be configured to provide support filter configuration or programming. It should be noted that application(s) 131 may be a user-space or kernel-space application. Request 430 may be an application programing interface (API) call that is issued to configure a new filter, or update an existing filter.

Each filter ($F_j$) may specify a set of packet characteristic(s) to be matched to an ingress packet, and an action to be performed when there is a match. Using M=total number of filters configured for VNIC1 135, a particular filter may be denoted as $F_j$, where $j \in \{0, \ldots, M-1\}$. Using N=number of queue, a particular queue may be denoted as Qi, where $i \in \{0, \ldots, N-1\}$. Any suitable action may be specified by filter ($F_j$), such as action=ASSIGN an ingress packet to a particular queue (Qi) of VNIC1 135, and action=DROP the ingress packet, etc.

Any suitable packet characteristic may be specified by filter ($F_j$), such as packet header information (e.g., inner header and/or outer header), packet payload information, packet metadata, etc. Example inner/outer header information specified by filter ($F_j$), may include: a source IP address, source MAC address, source port number, destination IP address, destination MAC address, destination port number, destination port number, protocol, logical overlay network information (e.g., VNI), or any combination thereof, etc. In practice, a packet characteristic may be defined using a range of values, a group that includes a set of distinct values or entities, etc.

At 320-325 in FIG. 3, in response to receiving request 430 from VM1 131 via guest driver 133, virtual device backend module 136 may perform filter configuration. In the example in FIG. 4, a set of M=5 filters labelled "F0" to "F4" (see 420-424) may be configured to differentiate between control packets and data packets.

Figure 4:
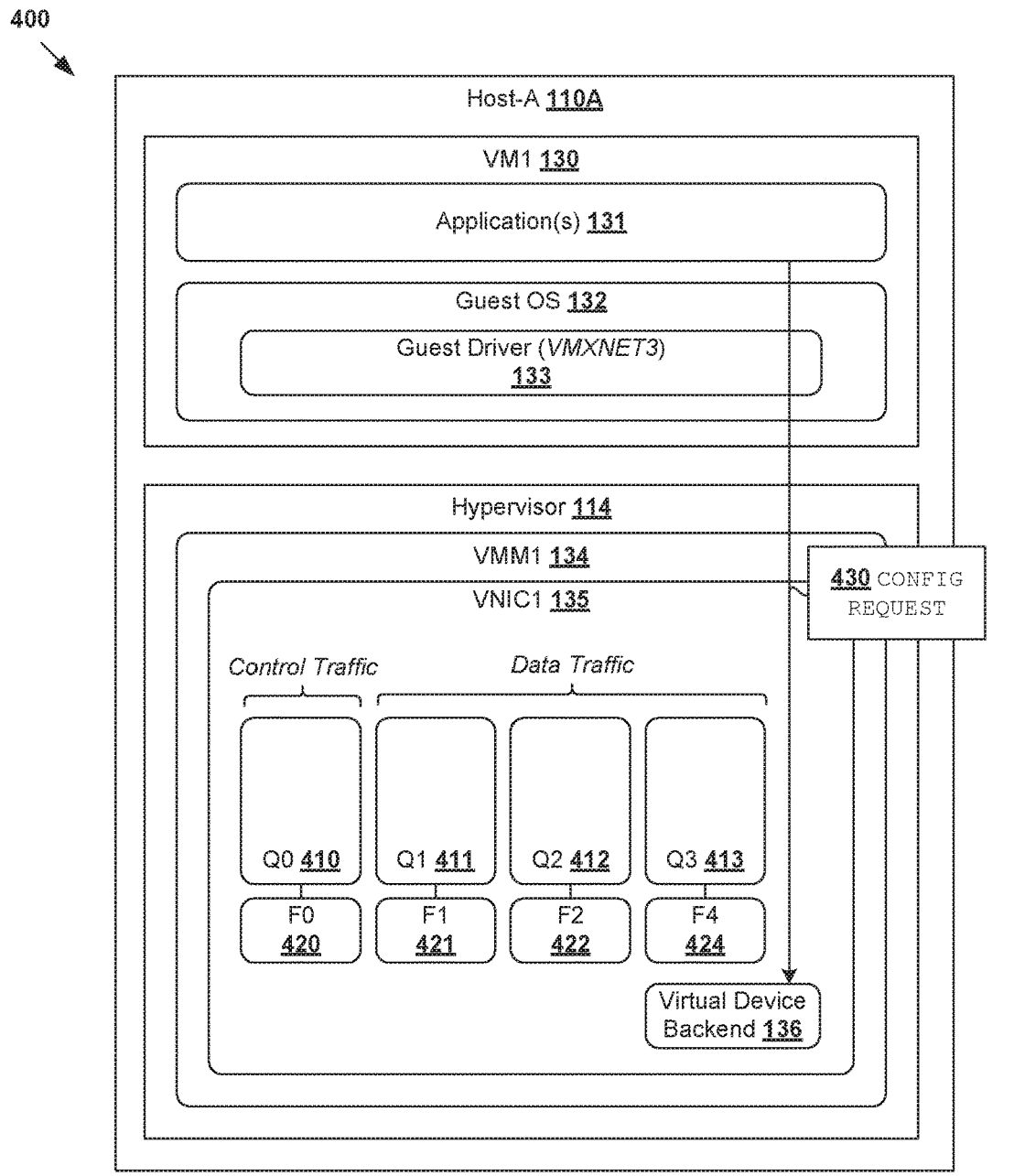
FIG. 4 is a schematic diagram illustrating an example filter configuration for a virtual network adapter according to the example in FIG. 3.

At 420 in FIG. 4, a first filter (labelled "F0") may specify control packet characteristics (protocol=UDP, port number=3784) to be matched with control packets, and action=ASSIGN to queue "Q0" 410 (i=0). In practice, the term "control packet" may refer generally to a packet that includes control information associated with an endpoint's (e.g., VM) operation(s), configuration(s), management, or any combination thereof, etc. For example, a control packet may be used to control the behavior of the endpoint. Any suitable "control packet" may be identified using the first filter, such as a bidirectional forwarding detection (BFD) packet for liveness detection, border gateway protocol (BGP) packet for route information exchange, management packet from management entity 170/180, etc. In practice, BFD may be implemented to support liveness detection in a high availability (HA) configuration, where VM1 130 in FIG. 4 is configured to be a member of a HA cluster.

Filters 421-424 may be matched with data packets. The term "data packet" may refer generally to a packet that includes any suitable information that a source wishes to send to a destination, such as for processing, querying, etc. At 421, a second filter (labelled "F1") may specify (protocol=TCP, port number=150) be matched with TCP data packets, and action=ASSIGN to queue "Q1" 411 (i=1). At 422, a third filter (labelled "F2") may specify (protocol=HTTPS, port number=443) be matched with HTTPS data packets, and action=ASSIGN to queue "Q2" 412 (i=2). At 423, a fourth filter (labelled "F3") may specify (protocol=TCP, source IP address=10.10.10.1) and action=DROP to block packets from a particular source. At 424, a fifth filter (labelled "F4") may assign all remaining packets to queue "Q3" 413 (i=3).

Filters 420-424 may be arranged in an order of precedence. For example, filter "F0" 420 has the highest priority (or highest precedence) and overrides all other filters 421-424. "F1" 421 has the second highest priority, followed by "F2" 422, "F3" 423 and "F4" 424 (i.e., lowest priority or precedence). In practice, an ingress packet may be matched with "F0" 420, followed by subsequent filters 421-424. Although not shown in FIG. 4, different filters may assign ingress packets to the same queue. For each type of traffic, any suitable number of associated filters and queues may be configured.

Example Packet Handling

At 330, 340 and 345 in FIG. 3, in response to receiving an ingress packet, host-A 110A may match the ingress packet to characteristics ($C_j$) specified by a particular filter ($F_j$), and perform a corresponding action when there is a match. The action may be to ASSIGN the ingress packet to a particular queue ($Q_i$) where $i \in \{0, \ldots, N-1\}$ at block 350, or DROP the ingress packet at block 355. Otherwise, the ingress packet will be handled using any other queue assignment approach (i.e., not specified by a filter). At 365-370, VM1 131 may retrieve the ingress packet from a particular queue ($Q_i$) where $i \in \{0, \ldots, N-1\}$ for processing.

Depending on the desired implementation, examples of the present disclosure may be implemented together with network driver technology such as RSS as a form of optimization. When RSS is enabled at VNIC 135/145, ingress packet processing for a particular packet flow may be shared across multiple processors or processor cores (instead of a single processor). In this case, at block 335 in FIG. 3, the ingress packet may be matched to an entry in an RSS cache that stores signatures or hash values of recently-processed ingress packets. If a match is found in the RSS cache, RSS-based packet handling will be performed accordingly. Otherwise, filter-based packet handling will be performed according to blocks 340-370. Alternatively, the RSS-based packet handling at block 335 may be performed after no matching filter is found (see 360) during filter-based packet handling.

(a) Steering of Control and Data Packets

Some examples will be explained using FIG. 5, which is a schematic diagram illustrating first example 500 of filter-based packet handling at a virtual network adapter in an SDN environment according to the example in FIG. 3. In the example in FIG. 5, filter-based packet handling may be implemented to improve the reliability of control traffic delivery, especially for applications that rely on a reliable exchange of control packets. In practice, this is beneficial in circumstances where the overall traffic volume is extremely high, but the control traffic volume is relatively low compared to data traffic volume (which is quite typical). In practice, any suitable number of filters may be configured or programmed to differentiate between control packets and data packets. Multiple filters may also be configured to differentiate between different types of control or data packets.

Figure 5:
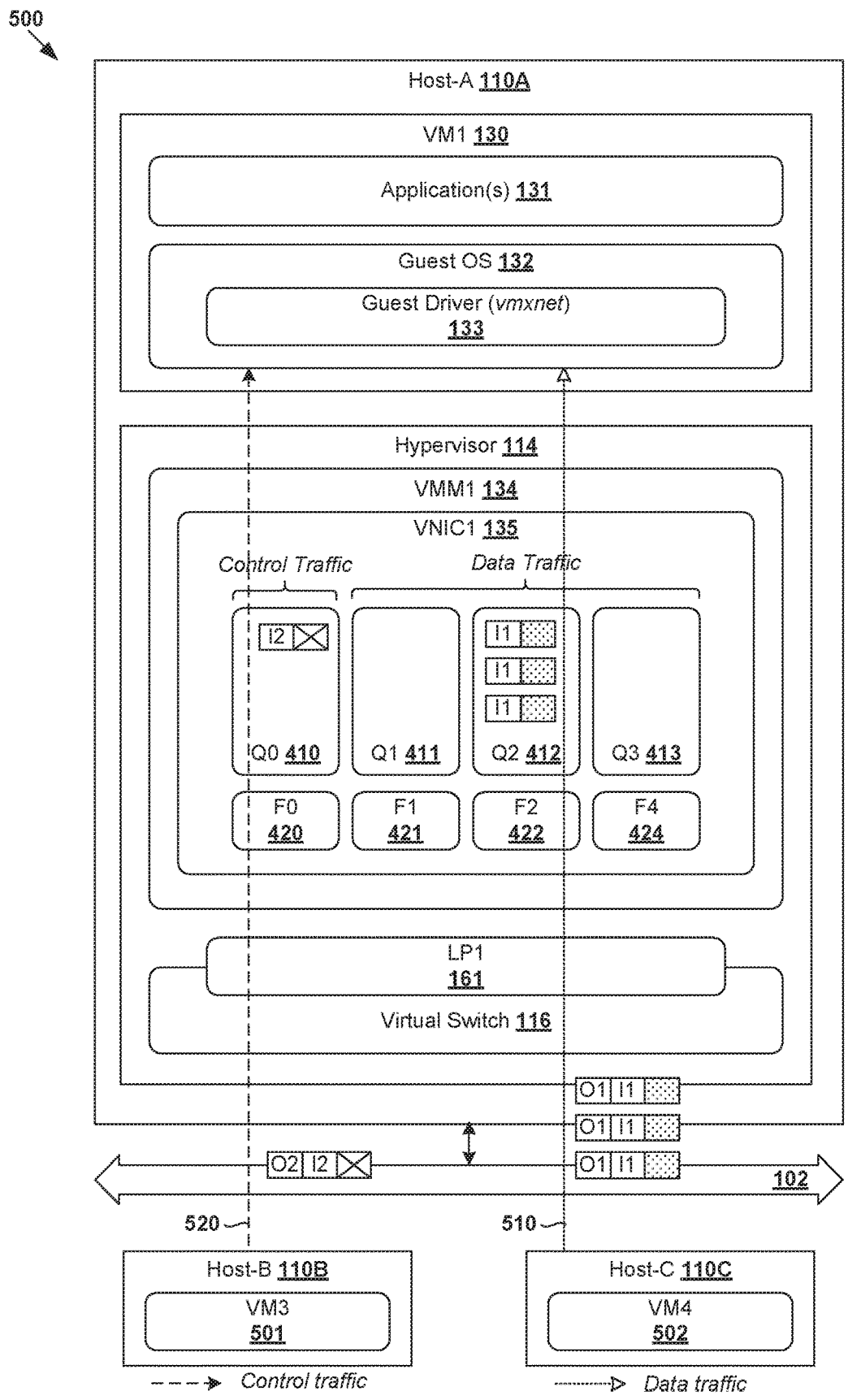
FIG. 5 is a schematic diagram illustrating a first example filter-based packet handling at a virtual network adapter according to the example in FIG. 3.

Depending on the desired implementation, hosts 110A-C in FIG. 5 may each implement a virtual tunnel endpoint (VTEP) to encapsulate and decapsulate packets with an outer header (also known as a tunnel header). For example, a first VTEP associated with (IP address=IP-A, MAC address=MAC-A, VTEP label=VTEP-A) may be implemented by host-A 110A; a second VTEP with (IP-B, MAC-B, VTEP-B) by host-B 110B and a third VTEP with (IP-C, MAC-C, VTEP-C) by host-C 110C. This way, encapsulated packets may be sent via an overlay tunnel between each pair of VTEPs over physical network 102. Any suitable tunneling protocol may be used for the overlay tunnel, such as Generic Network Virtualization Encapsulation (GENEVE), etc.

In the example in FIG. 5, consider a scenario where VM1 130 on host-A 110A and VM3 501 on host-B 110B are configured to be members of a HA cluster. Using an active-standby configuration, for example, VM1 130 may be assigned with role=primary (i.e., active), and VM3 501 assigned with role=secondary (i.e., standby). In practice, VM1 130 and VM3 501 may be network functions virtualization (NFV) VMs that are configured to provide a networking service to other VMs in SDN environment 100, such as firewall, load balancing, NAT, intrusion detection system (IDS), intrusion prevention system (IPS), deep packet inspection (DPI), etc. In case of a failure at the active VM, a switchover or failover process may be initiated for the standby VM to take over as the active VM. In practice, an active-active configuration may also be used.

Each member of the HA cluster may monitor each other's status (i.e., alive or not) by exchanging control packets, such as using a fault detection or continuity check protocol such as BFD. For example in FIG. 5, VM1 131 on host-A 110A may receive control packets from VM3 501 on host-B 110B (see 510). However, VM1 131 may also receive a large volume of data packets from other sources, such as VM4 502 on host-C 110C (see 510). In this case, there is a risk that control packets from VM3 501 may be lost or discarded, such as due to insufficient CPU cycles and/or buffer space. Since the control packets indicate the aliveness of VM3 501, the loss of control packets may lead to the false conclusion that VM3 501 has failed when in fact VM3 501 is still alive.

According to examples of the present disclosure, filters 420-424 may be applied to identify control packets and data packets, and deliver them to different queues at VNIC1 135. At 510 in FIG. 5, host-C 110C may generate and send encapsulated packets to host-A 110A. Each encapsulated packet may include an outer header (labelled "O1") specifying (source VTEP IP address=IP-C, destination IP address=IP-A), an inner header (labelled "I1") specifying (source IP address=IP-VM3, destination IP address=IP-VM1) and payload information. In response to receiving encapsulated packets, host-A 110A may perform decapsulation to remove the outer header, and match the decapsulated packet to any one of filters 420-424. In response to determination that the decapsulated packet is a data packet based on a match with filter="F2" 422, the data packet will be assigned to queue="Q2" 412.

At 520 in FIG. 5, host-B 110B may generate and send encapsulated packets to host-A 110A. Each encapsulated packet may include an outer header (labelled "O2") specifying (source VTEP IP address=IP-B, destination IP address=IP-A), an inner header (labelled "I2") specifying (source IP address=IP-VM4, destination IP address=IP-VM1) and payload information. In response to receiving encapsulated packets, host-A 110A may perform decapsulation to remove the outer header, and match the decapsulated packet to any one of filters 420-424. In response to determination that the decapsulated packet is a control packet based on a match with filter="F0" 420, the control packet will be assigned to queue="Q0" 410.

As such, filter "F0" 420 may be configured to specify control packet characteristics (e.g., protocol=UDP, destination port number=3784) associated with HA configuration to identify control packets. Filter "F2" 422 may be configured to specify data packet characteristics (e.g., protocol=HTTPS, destination port number=443) to identify data packets that, for example, require processing by VM1 130. This way, even when VNIC1 135 has to handle a large volume of data traffic (see 510) and a low volume of control traffic (see 520), filters may be applied to separate the different traffic. This way, control traffic may be delivered to VM1 130 in a more reliable manner.

Depending on the desired implementation, VM1 130 may retrieve packets 510/520 from queues 410-413 using any suitable approach. For example, the processing of control packets may be assigned with a higher priority compared to that of data packets. By steering control packets and data packets to respective dedicated queues, differentiated or prioritized packet handling may be performed.

(b) Intrusion Detection and Prevention

In another example, filter-based packet handling may be implemented for intrusion detection and prevention to protect against malicious attacks. For example, a distributed denial of service (DDOS) attack is a malicious network attack that involves hackers sending a large volume of traffic to one specific service or website with the intention of overwhelming it with false traffic. To protect against such malicious attacks, a particular filter ($F_j$) may be configured according to 310-325 in FIG. 3 to specify malicious packet characteristics ($C_j$) for identifying malicious packets, and an action ($A_j$) to drop the malicious packets.

Figure 6:
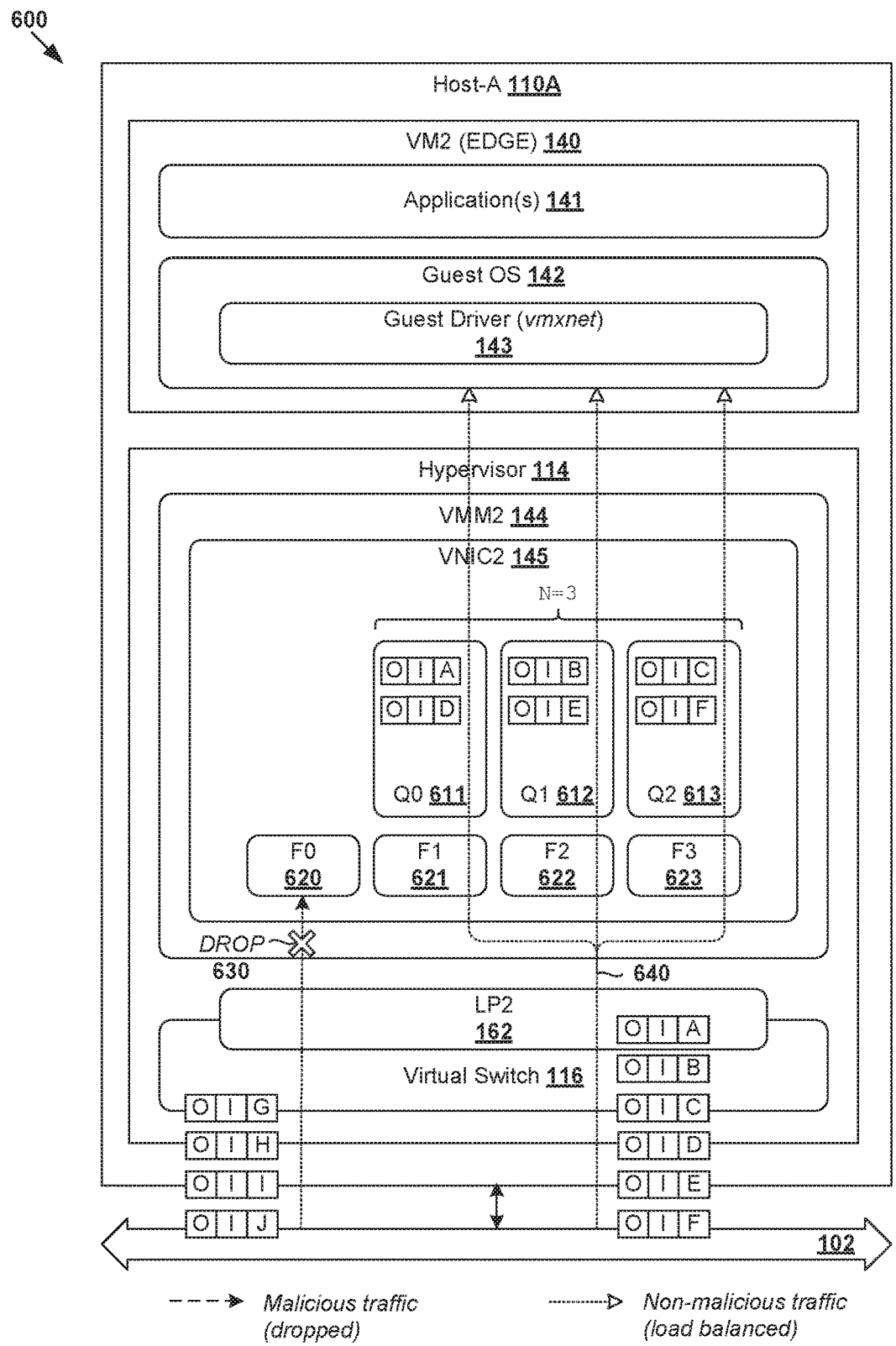
FIG. 6 is a schematic diagram illustrating a second example filter-based packet handling at a virtual network adapter according to the example in FIG. 3.

FIG. 6 is a schematic diagram illustrating second example 600 of filter-based packet handling at a virtual network adapter in an SDN environment according to the example in FIG. 3. In the example in FIG. 6, consider the scenario where VM2 140 (e.g., edge node or appliance) is connected to VNIC2 145 that includes N=3 packet queues labelled "Q0" 611, "Q1" 612 and "Q2" 613. At 620, a malicious packet filter (labelled "F0") may be configured to identify malicious packets. Filter "F0" 620 may specify any suitable malicious packet characteristics, which may be obtained from third-party data store(s). In response to receiving and matching malicious packets (with payload labelled "G" to "J") to filter "F0" 620, an action=drop specified by "F0" 620 will be performed. This way, a malicious attack may be detected and prevented. See 630 in FIG. 6. Packet queues 611-613 may be used to store non-malicious traffic.

(c) Filter-Based Load Balancing

In the example in FIG. 6, load balancing may be implemented at VNIC2 145 by configuring multiple filters 621-623 to distribute ingress traffic among queues 611-613. For example, filter "F1" 621 may specify action=ASSIGN to queue "Q0" 611, filter "F2" 622 to queue "Q1" 612, and filter "F3" 623 to queue "Q2" 613. Depending on the desired implementation, VM2 140 may be configured to perform decapsulation. In this case, in response to receiving encapsulated packets (with payload labelled "A" to "F"), the encapsulated packets may be assigned to queues 621-623 based on respective filters 621-623 for load balancing purposes. See 640 in FIG. 6.

Filters 620-623 may be configured by application(s) 141 by generating and sending a request to virtual device backend 146 via driver 143. In the example in FIG. 6, since VM2 140 is capable of handling encapsulated packets, filters 621-623 may specify both inner header and outer header characteristics (e.g., 10-tuple information), such as 5-tuple (source address, destination address, source port number, destination port number, protocol) in an inner header (labelled "I") and 5-tuple in an outer header (labelled "O") of an ingress packet.

Hardware Offload Capability

According to examples of the present disclosure, two layers of filter-based packet handling may be implemented, i.e., a first level at PNIC 124 and a second level at VNIC 135/145. In this case, prior to matching an ingress packet to one of multiple filters 420-424 configured for VNIC 135/145, the ingress packet may be matched to one of multiple PNIC filters configured for PNIC 125 to assign the ingress packet to one of multiple PNIC queues. An example is shown in FIG. 7, which is a schematic diagram illustrating third example 700 filter-based packet handling at a virtual network adapter with hardware offload capability.

At the first layer, PNIC filters 720-723 (labelled "PF0" to "PF3") may be configured to assign matching ingress packets to respective PNIC queues 710-713 (labelled "PQ0" to "PQ3"). At the second layer, ingress packets in physical NIC queues 710-713 may be matched to filters 420-424 in FIG. 4 to drop them (see "F3" 423) or assign them to different VNIC queues 410-413 at VNIC1 135. For example, ingress packets in PNIC queue "PQ0" 710 may be assigned to VNIC queue "Q0" 410 based on a match with VNIC filter "F0" 420. In another example, ingress packets in PNIC queue "PQ2" 712 may be assigned to VNIC queue "Q3" 413 based on a match with filter "F4" 424. In practice, any suitable approach may be used to select the appropriate PNIC queue(s) of PNIC 124 to support the hardware offload capability. For example, hypervisor 114 may be configured to convert the VNIC filter configurations to PNIC filter configurations, to identify the teaming/mapping PNIC queues with hardware offload capabilities, and to program the PNIC filters on PNIC 124.

Figure 7:
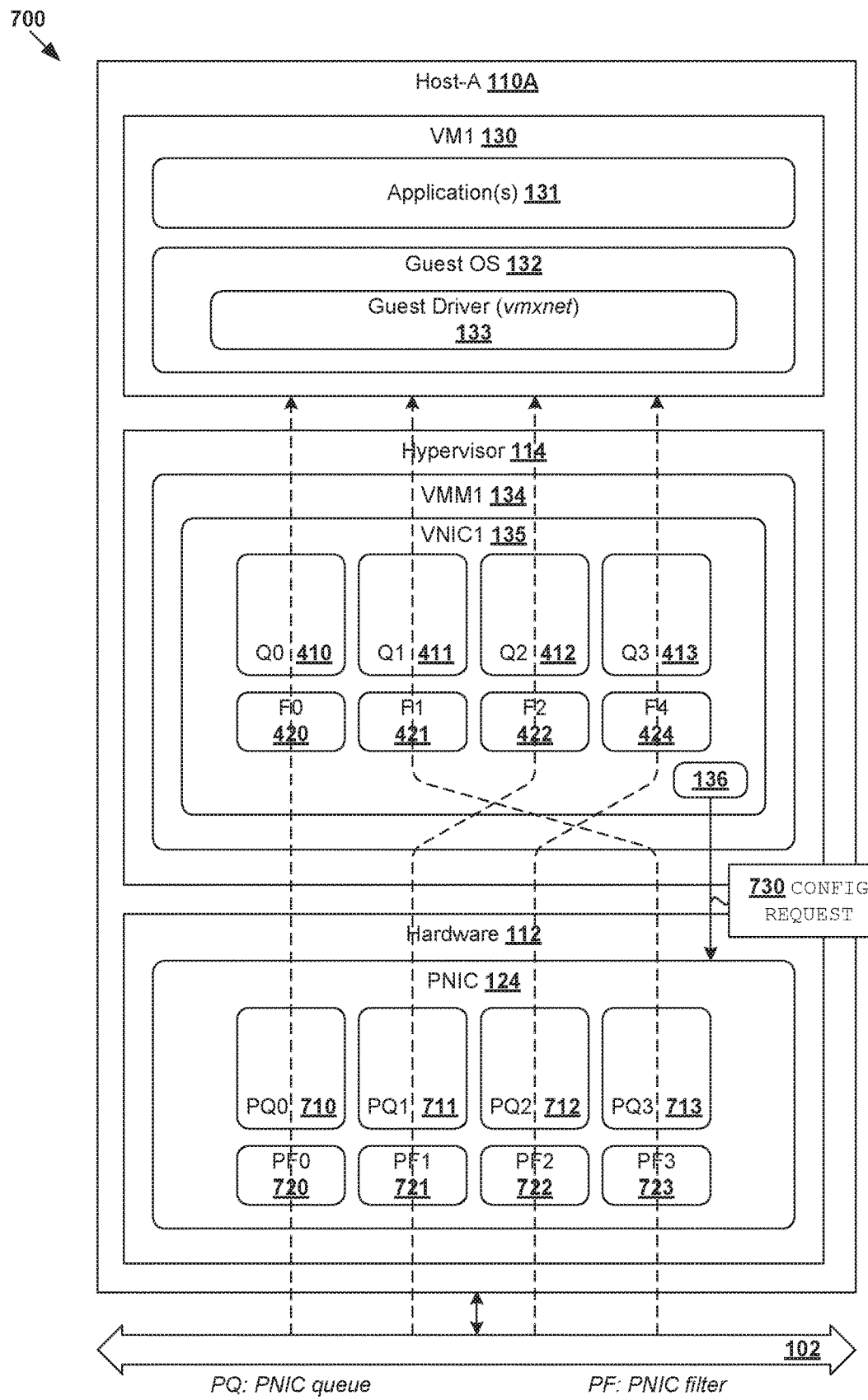
FIG. 7 is a schematic diagram illustrating a third example filter-based packet handling at a virtual network adapter with hardware offload capability.

The configuration of PNIC filters 720-723 may be initiated using virtual device backend 136/146 (see also 730 in FIG. 7). Compared to the software implementation at VNIC 135/145, PNIC filters 720-723 and PNIC queues 710-713 may be implemented using hardware. In practice, the number of PNIC queues 710-713 does not have to match with the number of VNIC queues 410-413. Also, PNIC queues 710-713 may be configured to handle overlay traffic (encapsulated packets). In this case, PNIC filters 720-723 may be configured to match with characteristics in an inner header of an ingress packet (e.g., inner 5 tuples), its outer header (e.g., outer 5 tuples), or both (e.g., 10 tuples).

Container Implementation

Although explained using VMs, it should be understood that SDN environment 100 may include other virtual workloads, such as containers, etc. As used herein, the term "container" (also known as "container instance") is used generally to describe an application that is encapsulated with all its dependencies (e.g., binaries, libraries, etc.). In the examples in FIG. 1 to FIG. 7, container technologies may be used to run various containers inside VM1 130. Containers are "OS-less", meaning that they do not include any OS that could weigh 10 s of Gigabytes (GB). This makes containers more lightweight, portable, efficient and suitable for delivery into an isolated OS environment. Running containers inside a VM (known as "containers-on-virtual-machine" approach) not only leverages the benefits of container technologies but also that of virtualization technologies. The containers may be executed as isolated processes inside respective VMs.

Computer System

The above examples can be implemented by hardware (including hardware logic circuitry), software or firmware or a combination thereof. The above examples may be implemented by any suitable computing device, computer system, etc. The computer system may include processor(s), memory unit(s) and physical NIC(s) that may communicate with each other via a communication bus, etc. The computer system may include a non-transitory computer-readable medium having stored thereon instructions or program code that, when executed by the processor, cause the processor to perform processes described herein with reference to FIG. 1 to FIG. 7. For example, a computer system capable of acting as host 110A/110B/110C may be deployed in SDN environment 100.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

We claim:

1. A method for a host to perform filter-based packet handling at a virtual network adapter, wherein the method comprises:
    receiving an ingress packet destined for a virtualized computing instance that is supported by the host and connected to the virtual network adapter;
    matching the ingress packet to one of multiple filters configured for the virtual network adapter, wherein the multiple filters include a first filter specifying one or more control packet characteristics and a second filter specifying one or more packet characteristics other than the control packet characteristics; and
    in response to matching the ingress packet to the first filter, assigning the ingress packet to a first packet queue of the virtual network adapter for processing by the virtualized computing instance; and
    in response to matching the ingress packet to the second filter, assigning the ingress packet to a second packet queue of the virtual network adapter for processing by the virtualized computing instance, or dropping the ingress packet.

2. The method of claim 1, wherein the method further comprises:
    prior to receiving the ingress packet, configuring the first filter or the second filter based on a request from the virtualized computing instance.

3. The method of claim 2, wherein the method further comprises:
    configuring the first filter or the second filter using a virtual device backend module supported by the host, wherein the request originates from an application supported by the virtualized computing instance.

4. The method of claim 1, wherein matching the ingress packet to one of the multiple filters comprises at least one of the following:
    matching the ingress packet to the first filter to identify that the ingress packet is a control packet; and
    matching the ingress packet to the second filter to identify that the ingress packet is a data packet.

5. The method of claim 1, wherein matching the ingress packet to one of the multiple filters comprises at least one of the following:
    matching the ingress packet to the first filter or the second filter based on at least one of the following inner header characteristics of the ingress packet: inner source address, inner destination address, inner source port number, inner destination port number, inner protocol; and
    matching the ingress packet to the first filter or the second filter based on at least one of the following outer header characteristics of the ingress packet: outer source address, outer destination address, outer source port number, outer destination port number, outer protocol and logical overlay network information.

6. The method of claim 1, wherein matching the ingress packet to one of the multiple filters comprises:
    matching the ingress packet to the second filter to determine that the ingress packet is a malicious packet to be dropped.

7. The method of claim 1, wherein the method further comprises:
    prior to matching the ingress packet to one of multiple filters configured for the virtual network adapter, matching the ingress packet to one of multiple physical network adapter filters configured for a physical network adapter of the host to assign the ingress packet to a physical packet queue at the physical network adapter.

8. A non-transitory computer-readable storage medium that includes a set of instructions which, in response to execution by a processor of a computer system, cause the processor to perform a method of filter-based packet handling at a virtual network adapter, wherein the method comprises:
    receiving an ingress packet destined for a virtualized computing instance that is supported by the host and connected to the virtual network adapter;
    matching the ingress packet to one of multiple filters configured for the virtual network adapter, wherein the multiple filters include a first filter specifying one or more control packet characteristics and a second filter specifying one or more packet characteristics other than the control packet characteristics; and
    in response to matching the ingress packet to the first filter, assigning the ingress packet to a first packet queue of the virtual network adapter for processing by the virtualized computing instance; and
    in response to matching the ingress packet to the second filter, assigning the ingress packet to a second packet queue of the virtual network adapter for processing by the virtualized computing instance, or dropping the ingress packet.

9. The non-transitory computer-readable storage medium of claim 8, wherein the method further comprises:
    prior to receiving the ingress packet, configuring the first filter or the second filter based on a request from the virtualized computing instance.

10. The non-transitory computer-readable storage medium of claim 9, wherein the method further comprises:
    configuring the first filter or the second filter using a virtual device backend module supported by the computer system, wherein the request originates from an application supported by the virtualized computing instance.

11. The non-transitory computer-readable storage medium of claim 8, wherein matching the ingress packet to one of the multiple filters comprises at least one of the following:
  matching the ingress packet to the first filter to identify that the ingress packet is a control packet; and
  matching the ingress packet to the second filter to identify that the ingress packet is a data packet.

12. The non-transitory computer-readable storage medium of claim 8, wherein matching the ingress packet to one of the multiple filters comprises at least one of the following:
  matching the ingress packet to the first filter or the second filter based on at least one of the following inner header characteristics of the ingress packet: inner source address, inner destination address, inner source port number, inner destination port number, inner protocol; and
  matching the ingress packet to the first filter or the second filter based on at least one of the following outer header characteristics of the ingress packet: outer source address, outer destination address, outer source port number, outer destination port number, outer protocol and logical overlay network information.

13. The non-transitory computer-readable storage medium of claim 8, wherein matching the ingress packet to one of the multiple filters comprises:
  matching the ingress packet to the second filter to determine that the ingress packet is a malicious packet to be dropped.

14. The non-transitory computer-readable storage medium of claim 8, wherein the method further comprises:
  prior to matching the ingress packet to one of multiple filters configured for the virtual network adapter, matching the ingress packet to one of multiple physical network adapter filters configured for a physical network adapter of the computer system to assign the ingress packet to a physical packet queue at the physical network adapter.

15. A computer system configured to perform filter-based packet handling, wherein the computer system comprises:
  a processor;
  a virtual network adapter; and
  a non-transitory computer-readable medium having stored thereon instructions that, when executed by the processor, cause the processor to perform the following:
    receive an ingress packet destined for a virtualized computing instance that is supported by the computer system and connected to the virtual network adapter;
    match the ingress packet to one of multiple filters configured for the virtual network adapter, wherein the multiple filters include a first filter specifying one or more control packet characteristics and a second filter specifying one or more packet characteristics other than the control packet characteristics;
    in response to matching the ingress packet to the first filter, assign the ingress packet to a first packet queue of the virtual network adapter for processing by the virtualized computing instance; and
    in response to matching the ingress packet to the second filter, assign the ingress packet to a second packet queue of the virtual network adapter for processing by the virtualized computing instance, or dropping the ingress packet.

16. The computer system of claim 15, wherein the instructions further cause the processor to:
  prior to receiving the ingress packet, configure the first filter or the second filter based on a request from the virtualized computing instance.

17. The computer system of claim 16, wherein the instructions further cause the processor to:
  configure the first filter or the second filter using a virtual device backend module supported by the computer system, wherein the request originates from an application supported by the virtualized computing instance.

18. The computer system of claim 15, wherein the instructions for matching the ingress packet to one of the multiple filters cause the processor to perform at least one of the following:
  match the ingress packet to the first filter to identify that the ingress packet is a control packet; and
  match the ingress packet to the second filter to identify that the ingress packet is a data packet.

19. The computer system of claim 15, wherein the instructions for matching the ingress packet to one of the multiple filters cause the processor to perform at least one of the following:
  match the ingress packet to the first filter or the second filter based on at least one of the following inner header characteristics of the ingress packet: inner source address, inner destination address, inner source port number, inner destination port number, inner protocol; and
  match the ingress packet to the first filter or the second filter based on at least one of the following outer header characteristics of the ingress packet: outer source address, outer destination address, outer source port number, outer destination port number, outer protocol and logical overlay network information.

20. The computer system of claim 15, wherein the instructions for matching the ingress packet to one of the multiple filters cause the processor to:
  match the ingress packet to the second filter to determine that the ingress packet is a malicious packet to be dropped.

21. The computer system of claim 15, wherein the instructions further cause the processor to:
  prior to matching the ingress packet to one of multiple filters configured for the virtual network adapter, match the ingress packet to one of multiple physical network adapter filters configured for a physical network adapter of the computer system to assign the ingress packet to a physical packet queue at the physical network adapter.

* * * * *